US005790703A

United States Patent [19]

Wang

[11] Patent Number: 5,790,703
[45] Date of Patent: Aug. 4, 1998

[54] DIGITAL WATERMARKING USING CONJUGATE HALFTONE SCREENS

[75] Inventor: Shen-ge Wang, Fairport, N.Y.

[73] Assignee: Xerox Corporation, Stamford, Conn.

[21] Appl. No.: 785,679

[22] Filed: Jan. 21, 1997

[51] Int. Cl.$^6$ .......................... G06K 9/74; H04N 1/405; H04N 1/52

[52] U.S. Cl. .......................... 382/212; 382/237; 358/456; 380/54; 283/113; 283/94

[58] Field of Search .......................... 382/219, 212, 382/218, 278, 283, 294; 380/6, 9, 18, 23, 54, 59, 51; 283/901, 113, 94; 358/456, 534, 536

[56] References Cited

U.S. PATENT DOCUMENTS

| | | | |
|---|---|---|---|
| 3,675,948 | 7/1972 | Wicker | 283/901 |
| 4,210,346 | 7/1980 | Mowry, Jr. et al. | 283/94 |
| 5,315,098 | 5/1994 | Tow | 235/494 |
| 5,337,361 | 8/1994 | Wang et al. | 380/51 |
| 5,341,228 | 8/1994 | Parker et al. | 358/534 |
| 5,396,559 | 3/1995 | McGrew | 380/54 |
| 5,488,664 | 1/1996 | Shamir | 380/54 |
| 5,583,950 | 12/1996 | Prokoski | 382/212 |
| 5,734,752 | 3/1998 | Knox | 382/212 |

FOREIGN PATENT DOCUMENTS

0651554A1 10/1994 European Pat. Off. .......... H04N 1/21

OTHER PUBLICATIONS

*Digimarc;* "Digimarc Corp. Announces New Copyright Protection Technology; Irremovable Signatures Protect Creative Property in the Digital Age"; Jun. 28, 1995.

"Dice and Digimarc File for Patents for 'Scatter–Gun' Electronic Watermark Technology"; Oct. 4, 1995; Computergram International.

"Holographic Signatures for Digital Images; Authentication, Verification and Protection for Copyright Holders"; (Digimarc Corp's Copyright Protection Technology); Aug. 14, 1995, Seybold Report on Desktop Publishing, V. 9, N. 12, p. 23(2).

"NEC Develops digital Watermarking Technique Protecting Copyrights of Images and Music on Internet," Feb. 12, 1996, Business Wire.

"NEC Developes Digital Watermark Technology", Feb. 20, 1996, Newsbytes.

"NEC Develops Electronic Water Mark in the U.S.", Feb. 15, 1996, Computergram International, n. 852.

"Cloaking Device for Top–Secret Faxes", Electronic Imaging Review, Center for Electronic Imaging Systems, University of Rochester, Rochester, NY, Fall, 1995, vol. 2, No. 3, p. 4.

"Counterfeit Detection Method", Xerox Disclosure Journal, vol. 20, No. 6, Nov./Dec. 1995.

*Primary Examiner*—Scott Rogers
*Attorney, Agent, or Firm*—Duane C. Basch

[57] ABSTRACT

A method for generating watermarks in a digitally reproducible document which are substantially invisible when viewed including the steps of: (1) producing a first screen pattern suitable for reproducing a gray image on a document; (2) deriving at least one conjugate screen description that is related to said first pattern; (3) producing an image containing the first screen; (4) producing a second image containing the first and the second screens in combination, whereby upon placing the first and second images in a superposed relationship autocorrelation between the first pattern on each document occurs everywhere within the documents where the first screen is used, and conjugate correlation occurs where the first and second screens occur and the image placed therein using the conjugate screens becomes detectable (e.g., visible) due to the high contrast between the autocorrelated and conjugately correlated regions. As a result of the use of the first and second screens in an alternating fashion within a document, the images created therefrom are self-referencing, meaning that the superposition of the images in an offset manner maximizes the contrast of the watermark.

14 Claims, 4 Drawing Sheets

DIGITAL WATERMARKING USING CONJUGATE HALFTONE SCREENS

The present invention is directed to a process for applying a digital watermark to a sheet to enable verification of its authenticity and more particularly, to digital watermark patterns which are perceptibly invisible.

CROSS REFERENCE

The following related application is hereby incorporated by reference for its teachings:

"Digital Watermarking Using Stochastic Screen Patterns," Keith T. Knox, application Ser. No. 08/719,235, filed Sep. 24, 1996.

BACKGROUND AND SUMMARY OF THE INVENTION

The present invention is directed to an improved method for producing digital watermarks. Watermarks have long been used in the printing industry to identify the source or origin of a document. Generally, a watermark appears as a faint pattern in an image which is visible only when the original document is viewed in a particular manner. Unless a copyist had access to the watermarked paper, it would be difficult for him to reproduce the document without showing its inauthenticity. That is to say, without the paper on which the original image was originally printed, the copy should be readily detectable. However, as people move away from the use of watermarked papers for cost and other practical reasons, it is still necessary to identify the source or origin of a document image.

The introduction of the plain paper copier has resulted in a proliferation of paper copies of paper originals. A similar result is happening to electronic images, given the easy availability of digital scanners and a quick and widespread access to images throughout the Internet. It is now very difficult for the creator of an image to generate an electronic original, for which he can be assured that illegal copies will not be spread to third parties. The use of a digital watermark is a technology that aims to prevent that spread, by incorporating an identifying mark within the image that allows one to identify the source of the image in an electronic copy. It is important that the identifying mark not be disturbing or distracting to the original content of the image, while at the same time, allowing an easy identification of the source. The watermarks could be added either by the scanner or by the halftoning software.

Watermark identification may be accomplished by embedding a digital watermark in a digital or printed page that will identify the owner of rights to the image. In the past, these images have been produced and delivered in hard copy. In the future, these images will be distributed mainly in digital form. Therefore, image identification will have to work for both hard copy and digital image forms.

Watermarking can take two basic forms, visible or perceptible and invisible or imperceptible. Visible watermarks are marks such as copyright logos or symbols or logos that are imprinted into the digital or printed image to be distributed. The presence of the watermark is made clearly visible in the image in a way that makes it difficult to remove without damaging the image. The presence of the visible watermark does not harm the usefulness of the image, but it prevents the image from being used without permission. However, visible watermarks may interfere with the use of the image or with the image aesthetics. The visible watermark is also a potential target for fraud, in that it is possible for a fraudulent copier of the image to identify the location of the watermark and attempt to reproduce the image without the watermark.

Invisible watermarks are marks such as copyright symbols, logos, serial numbers, etc. that are embedded into digital or printed images in a way which is not easily discernible to the unaided eye. At a later time, the information embedded in these watermarks can be derived from the images to aid identification of the source of the image, including the owner and the individual to whom the image is sold. Such watermarks are useful for establishing ownership when ownership of an image is in dispute. They will be less likely to be useful as a deterrent to the theft of the image.

While either or both visible or invisible watermarks are desirable in an image, they represent different techniques for either preventing copying or detecting copying. It is anticipated that document producers may wish to use both kinds of protection.

Heretofore, a number of patents and publications have disclosed watermarking or other digital information encoding techniques for use with documents. The patents and publications summarized below are all incorporated by reference herein for their teachings.

A method of embedding information into halftones was suggested by Tuhro, "Counterfeit Detection Method", Xerox Disclosure Journal, Vol. 20, No. 6, November/December 1995. This method would make slight deviations in the position of the halftone dots from cell to cell. Alternatively, the position of a line screen could be varied by small amounts to encode information. The decoding would be accomplished by laying a halftone screen that has no such deviations, on top of the encoded image. The locations of the halftone cell deviations, show up as a beat pattern. The difficulty of this method is that the information could easily be lost within the printer distortions. The goal would be to make the deviations as small as possible to avoid their being seen. This results in the deviations being hard to detect as well.

A second method is described in U.S. patent application Ser. No. 08/463,178, filed Jun. 5, 1995, in the name of Curry, and assigned to the same assignee as the present invention. This method processes halftone dots, called serpentine dots, that are symmetric in shape. These dots are designed to fit well together when rotated and placed side by side. This enables different rotations of the dots to be placed across the page, encoding arbitrary information into the halftone pattern. From a visual inspection, the changing shapes of the symmetric patterns are not displeasing to the eye. This method suffers from the same problems as the method by Tuhro. In order to make sure the information cannot be seen by the eye, the halftone cells need to be made as small as possible. As cell size is reduced, it becomes harder to detect cell orientation.

Yet another process for embedding information into an image is through the use of glyphs. Glyphs, the subject of Xerox patent U.S. Pat. No. 5,315,098 to Tow are small three to five pixel length lines in which the orientation of the line represents one of a small number of values. Thus, a stream of data can be represented by glyphs each line varying in orientation in order to provide an encoded view of the information. Glyphs differ from watermarks in that the glyphs encode information via some numerical method, while watermarks represent the actual image. The glyphs may be machine readable by means of human invisible characteristics of the print materials, such as their infrared reflectivity, their high resolution spectral detail, their metameric spectral characteristics, or their magnetization. These machine detectable materials may be incorporated into the same printing process that is employed for printing the human readable rendering, such as by utilizing xerographic toners which have machine recognizable, human invisible characteristics, together with their usual visible characteristics of color, whiteness, blackness, transparency and opacity.

U.S. Pat. No. 5,337,361 to Wang et al describes an information area that can overlay a graphic image and include information encoded in an error correctable, machine readable format, which allows recovery of the information despite distortions due to the underlying graphic image. The record may also represent the image by words similar in form to words in the image area. Both the image information and the graphic words can then be altered when an action regarding the record takes place. Wang et al differs from the present invention in that it essentially provides a bar code encoding information other than the image that is desired to be seen.

"Cloaking Device for Top-Secret Faxes", Electronic Imaging Review, Center for Electronic Imaging Systems, University of Rochester, Rochester, N.Y., Fall, 1995, Vol. 2, No. 3, Page 4, details software which supports an encryption method so that all the pages look the same: a random pattern of black and white dots filled with tiny black worms. The page is decrypted by placing a decryption key over the page. Text appears as either white lettering against a black background or dark lettering against a white background. Notably, in the images shown, the regions where the image is located is discernible via changes in the random pattern of black and white dots Several articles referencing a method of adding a digital water mark are noted with respect to Digimarc Corp.: "Digimarc Corp. Announces New Copyright Protection Technology; Irremovable Signatures Protect Creative Property in the Digital Age," Jun. 28, 1995, Business Wire, describes a copyright protection system in which hidden information is available with an image. See also, "Dice and Digimarc File for Patents for 'Scatter-Gun' Electronic Watermark Technology," Oct. 4, 1995, Computergram International; "Holographic signatures for digital images; authentication, verification and protection for copyright holders" (Digimarc Corp's copyright protection technology), Aug. 14, 1995, Seybold Report on Desktop Publishing, v.9, n. 12, p23(2).

Also note, "NEC develops digital watermarking technique protecting copyrights of images and music on Internet," Feb. 12, 1996,—Business Wire, describes watermark information hidden in an image, using the spectral components of the data in a manner analogous to spread spectrum communications. See also, "NEC Develops Digital Watermark Technology", Feb. 20, 1996, Newsbytes; "NEC Develops Electronic Water Mark in the U.S.", Feb. 15, 1996, Computergram International, n.852.

EP 0651 554 A1 (Eastman Kodak) and EP 0705 025 A2 (Eastman Kodak) describes a method of storing component parts of a watermark in hierarchical elements of a hierarchically stored image.

In accordance with the present invention, there is provided a process for generating an authenticable document, wherein an authentication image inserted therein is not readily visually perceptible, including the steps of:

generating a first stochastic halftone screen;

generating a first user image using the first stochastic halftone screen;

generating a second stochastic halftone screen, related and distinct from the first stochastic halftone screen to form the authentication image therein, wherein a region of the second stochastic halftone screen is substantially a conjugate of a corresponding region of the first halftone screen and a remaining region of the second stochastic halftone screen is uncorrelated to a remaining region of the first halftone screen; and generating a second user image using the second stochastic halftone screen whereby upon placing the first and second user images in a superposed relationship to allow viewing of both user images together, a conjugate correlation occurs between the two stochastic halftone screens in the first and second user images everywhere within the region in which the second stochastic halftone screen is a conjugate of the corresponding region of the first stochastic halftone screen, and where visible noncorrelation occurs where the two stochastic screens are uncorrelated, so that the authentication image becomes visible in contrast between the conjugate correlation of the corresponding regions and the non-correlation of the remaining regions enabling authentication of the authenticable document.

In accordance with another aspect of the present invention, there is provided a process for generating an authenticable document, wherein an authentication image inserted therein is not readily visually perceptible, including the steps of:

generating a first halftone screen;

generating a first image using the first halftone screen;

generating a second halftone screen, related and distinct from the first halftone screen to form the authentication image wherein a region of the second halftone screen is substantially a conjugate of a corresponding region of the first halftone screen and the remaining region of the second halftone screen is identical to the remaining region of the first halftone screen;

generating a second user image using the second stochastic halftone screen;

superposing the first and second images to enable the detection of a conjugate correlation between the halftone screens in the first and second user images everywhere within the corresponding regions where the second halftone screen is a conjugate of the first halftone screen and auto-correlation between the halftone screens in the remaining regions where the second halftone screen is identical to the first halftone screen, the authentication image placed therein becoming detectable in contrast between the conjugate correlation and the auto-correlation to allow authentication of the authenticable document.

In accordance with yet another aspect of the present invention, there is provided a method of providing an authenticable document which is self-referencing, including the steps of:

generating a first stochastic screen;

generating a second stochastic screen, related and distinct from the first stochastic screen to form the authentication image therein, wherein a region of the second stochastic screen is substantially conjugate of a corresponding region of the first screen and a remaining region of the second stochastic screen is identical to a remaining region of the first halftone screen;

generating a user image by alternatively using the first stochastic halftone screen and the second stochastic halftone screen;

for a document to be authenticated and distributed, including the generated user image, selecting a first portion generated by the first stochastic screen from the user image and a second portion generated by the second stochastic halftone screen from the same user image and superposing the two portions, whereby the authentication image placed therein using the second stochastic halftone screen is detectable as a result of contrast between the conjugate correlation of the corresponding regions and the auto-correlation of the remaining regions to authenticate the authenticable document.

One aspect of the invention deals with a basic problem in providing substantially invisible watermarks in a digitally reproducible document. In particular, the desire in digital watermarking is to increase the contrast of the digital watermark to improve its detectability.

A stochastic screen can be used to produce an invisible watermark. A stochastic halftone cell is a large threshold array that produces a halftone image having a random screen appearance. To produce an invisible watermark for a stochastic screen, at least one additional stochastic halftone cell is produced and used to incorporate watermark information into the document. In the embodiment described herein only one additional stochastic screen cell will be described. However, this embodiment is not intended to limit the number of stochastic halftone cells that can be used, since the extension to more stochastic screen cells is straightforward for those skilled in the art.

This aspect is further based on the discovery of a technique that alleviates this problem. The technique employs conjugate screens for the watermarked regions of the image, the conjugate screens providing increased correlation when overlaid with one another. The increased correlation in turn results in greater contrast of the watermark, thereby aiding in the detection of the watermark. The digital watermarking technique described herein is advantageous because it not only avoids detection by an unaided eye, it can be adapted to improve the automated recognition of digitally watermarked documents

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements.

The present invention allows for a gray pattern to be used on a document, where the gray pattern can be generated using a stochastic halftoning process to produce a desirable gray. However, using such techniques, the random nature of the stochastic screen affords the opportunity to include a unique authentication procedure in conjunction with correlations between two different stochastic screens.

Each location in an image may be called a "pixel." In an array defining an image in which each item of data or image signal provides a value, each value indicating the color of a location may be called a "pixel value". Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining the image. Initially, the process begins with gray scale image signals that have a gray level desirable for use in the watermark. The gray signals are typically in a continuous tone pattern and may be characterized as pixels or image signals that are defined in a set of C levels of optical density of reflectance. Each pixel will be processed in the manner described hereinbelow.

To redefine each pixel in terms of a new, smaller set of D levels, the pixels are processed by the stochastic screen processor herein described. In this process, C and D are integer values representing pixel depth, or a number of signal levels at which pixels may appear. Commonly, output printers will reproduce these image pixels with one or two levels for printing. Color gray levels would reproduce similarly, except that they would appear and be identified in association with a particular color separation for reproduction.

Figure 1:
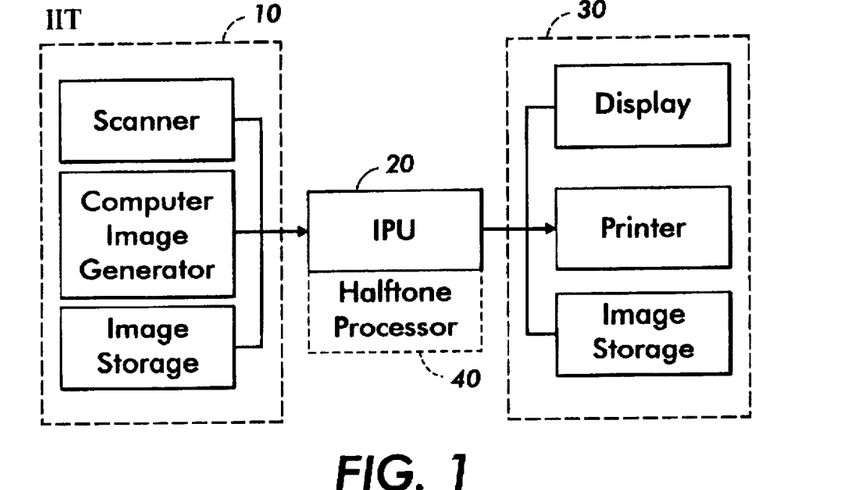
FIG. 1 represents a system in which the present invention may find particular use.

With reference now to FIG. 1 which shows a general system representing an embodiment of the invention, an electronic representation of an original document is obtained from an image input terminal 10 in a format related to the characteristics of the device and commonly with pixels defined at n bits per pixel. The electronic image signals will be directed through an image processing unit 20 to be processed so that an image suitable for reproduction on image output terminal 30 is obtained. Image processing unit 20 commonly includes a halftone processor 40 which converts m-bit digital image data signals to n-bit image data signals suitable for driving a particular printer or other device where m and n are integer values. Commonly, the images may be represented in a page description language format, describing the appearance of the page. In such a case, the IPU may include a processing element for decomposition of the page, and color conversion elements for providing appropriate signals to drive a printer.

Figure 2:
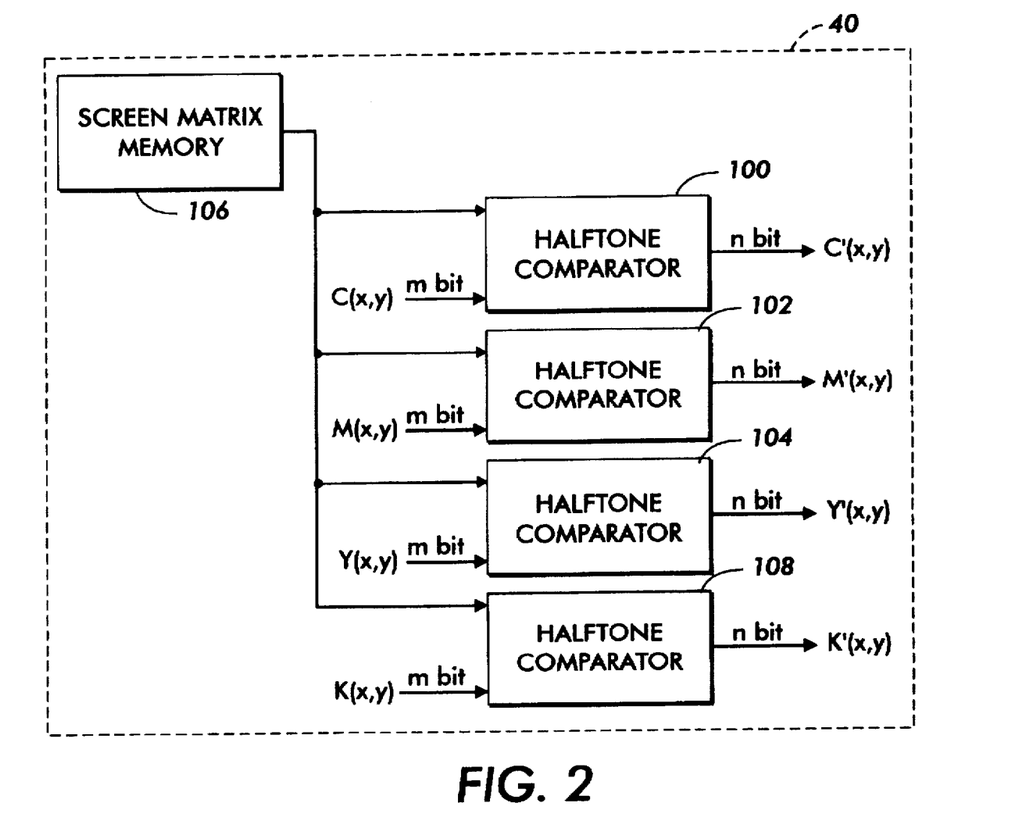
FIG. 2 is an illustration of a halftoning arrangement to produce a stochastic screen such as that required for one embodiment of present invention.

FIG. 2 shows the operational characteristics of halftone processor 40. In this example, there is illustrated a color processing system using four separations, C(x,y), M(x,y), Y(x,y), and K(x,y), obtained in each process independently for halftoning purposes to reduce an m-bit input to an n-bit output. It will be appreciated that the invention is also applicable to a single color separation or black and white reproduction situations as well. As depicted in the figure a source of screen matrix information, screen matrix memory 106 provides an input to each comparator 100, 102, 104, 106, and 108 for each color separation. The other input to each comparator is the m-bit color separation image data. The output of each comparator is n-bit output which can be directed to a printer or similar device for rendering. This illustration is highly simplified in that distinct screen matrices may be supplied to each comparator.

Next, the principle of stochastic screening will be discussed, including a method of generating stochastic screens. Other methods of generating such screens, perhaps including U.S. Pat. No. 5,341,228 to Parker et al., a halftoning system using a stochastic process known as a blue noise mask, may be useful. The present invention preferably employs the stochastic screening method described in U.S. patent application Ser. No. 08/663,419, filed Jun. 17, 1996, by Shen-ge Wang, assigned to the same assignee as the present invention, and hereby incorporated by reference for its teachings.

Consider generating halftone images from constant grayscale inputs by a screen matrix with N elements. If the overlap between adjacent pixels is ignored, the screen cell with n black pixels and N - n white pixels simulates the input with a gray scale (g) equal to $$g = (N-n)/N,$$

where $0 \leq n \leq N$, or $0 \leq g < 1$. The visual appearance of this pattern depends on whether the black pixels or the white pixels are minorities. If the black pixels are, for example, $0.5 \leq g \leq 1.0$, the best visual appearance of the halftone pattern occurs when all black pixels are "evenly" distributed, in other words, each black pixel should "occupy" $1/n$, or $1/(1-g)N$, fraction of the total area of the screen. Therefore, the average distance of adjacent black pixels should be equal to $\alpha(1-g)^{-\frac{1}{2}}$, where $\alpha$ is independent of gray levels. On the other hand, if the white pixels are minorities, i.e., $0 \leq g \leq 0.5$, each white pixel should "occupy" $1/(n-m)$ or $1/gN$, fraction of the total area and the average distance of adjacent white pixels should be equal to $\alpha g^{-\frac{1}{2}}$. An idealized stochastic dithering screen is defined as a threshold mask generating halftone images which satisfy the above criterion for all gray levels.

For the following discussion, the input gray-scale images are specified by integer numbers, $G(x, y)$, where $0 \leq G \leq M$. Under this assumption the dithering screen should have M different threshold values spanning from zero to M−1. We further assume that at each level there are (N/M) elements having the same threshold value T. The ultimate goal of designing a stochastic screen is to distribute the threshold values T so that the resulting halftone images are as close as possible to the ones generated by an idealized stochastic screen. Here, it is demonstrated that it is possible to create "good quality" stochastic screens using above criterion and optimization techniques.

Choosing an arbitrary pair of pixels from the dithering screen, we assume that the threshold values for these two pixels are $T_1 = T(x_1, y_1)$ and $T_2 = T(x_2, y_2)$, respectively, where $(x_1, y_1)$ and $(x_2, y_2)$ are the coordinates of these pixels. As the result of dithering a constant input G, the outputs $B_1 = B(x_1, y_1)$ and $B_2 = B(x_2, y_2)$ have the following possible combinations:

| | |
|---|---|
| 1. $B_1 = 1$ and $B_2 = 1$, | if $G \geq T_1$ and $G \geq T_2$; |
| 2. $B_1 = 0$ and $B_2 = 0$, | if $G < T_1$ and $G < T_2$; |
| 3. $B_1 \neq B_2$, | | where B=1 represents a white spot and B=0, a black spot for printing. Under combination 3, where one output pixel is black and another is white, their distance is irrelevant to the visual appearance according to the criterion discussed above. For case 1, we can further consider the difference between the two situations:

1a. if $M/2 \geq G, G \geq T_1, G \geq T_2$;
1b. elsewhere.

Under case 1 a both output pixels are white, and white spots are minorities. Therefore, the corresponding distance between $(x_1, y_1)$ and $(x_2, Y_2)$ is relevant to the visual appearance of the halftone images. According to our analysis above this distance is greater or equal to $\alpha g^{-\frac{1}{2}}$, or $\alpha(G/M)^{-\frac{1}{2}}$, for outputs of an idealized stochastic screen. Among all G under case 1a, the critical case of G is the smallest one, or $G_c = \text{Max}(T_1, T_2)$, which requires the largest distance between the two pixels $(x_1, y_1)$ and $(x_2, y_2)$.

Similarly, when both dots appear as black dots, the visual appearance under the following cases must be considered:

2a. if $G \geq M/2$, $G < T_1$ and $G < T_2$
2b. elsewhere.

Among all G under 2a, the largest G is given by $G_c = \text{Min}(T_1, T_2)$, which requires the largest distance $\alpha(1-G_c/M)^{-1/2}$ between $(x_1, y_1)$ and $(x_2, y_2)$.

Mathematically, we can use a merit function $q(T_1, T_2)$ to evaluate the difference between the idealized stochastic screen and the chosen one. For example, we used the following choice for the experiment described later:

$$q(T_1, T_2) = \exp(-C \cdot d^2/d_c^2), \qquad (1)$$

where

| | |
|---|---|
| $d^2 = (x_1 - x_2)^2 + (y_1 - y_2)^2$; | |
| $d_c^2 = M/M - \text{Min}(T_1, T_2)$, | if $T_2 > M/2$ and $T_1 > M/2$, |
| $d_c^2 = M/\text{Max}(T_1, T_2)$, | if $T_2 \leq M/2$ and $T_1 \leq M/2$, |
| $d_c^2 = 0$, i.e., $q = 0$, | elsewhere; | and C is a constant.

Since a dithering screen is used repeatedly for halftoning images larger than the screen, for any chosen pair of pixels from the dithering screen the closest spatial distance in corresponding halftone images depends on the dithering method and should be used for the merit function. The overall merit function should include contributions of all possible combinations. In an experiment the summation of $q(T_1, T_2)$ was for optimization, i.e.,

| | | |
|---|---|---|
| $Q = \Sigma q(T_1, T_2)$, | where $\Sigma$ for all $(x_1, y_1) \neq (x_2, y_2)$. | (2) |

Now, the design of stochastic screens becomes a typical optimization problem. When the threshold values of a chosen screen are rearranged the merit function can be evaluated to determine the directions and steps. Many existing optimization techniques can be applied to this approach. The simplest method is to randomly choose a pair of pixels and swap threshold values to see if the overall merit function Q is reduced. Since only those Q values related to the swapped pair need to be recalculation, the evaluation of Q does not consume significant computation time.

In an example, using the proposed design procedure to produce a screen matrix with 128×64 elements and 256 gray levels was produced. All initial threshold values were randomly chosen by a standard random number generator. Alternatively, the threshold assignments from an existing screen may be used. Besides the Gaussian function described by Eq. (1) as the merit function other functions were tested, such as the Butterworth function and its Fourier transform. Other optimization functions are possible. For this example. Equations (1) and (2) were used as the merit function of optimization. Since this mask is a 45° rotated screen, the 128×64 pattern is repeated with a lateral shift equal to 64. To calculate the overall merit function we considered all pairs of pixels including those with the shift. A Sun Sparc 10 workstation was used for this design test.

For each iteration a pair of pixels was randomly chosen from the dithering screen, their threshold values swapped and the change of the merit function Q was calculated. If Q was not reduced, we restored the threshold values, otherwise, we proceeded to the next iteration.

Figure 3:
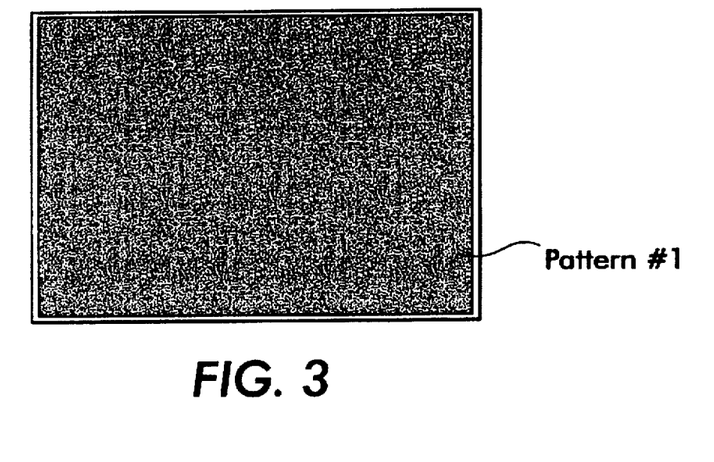
FIG. 3 is an illustration of a halftone image generated by a first stochastic screen.
Figure 4:
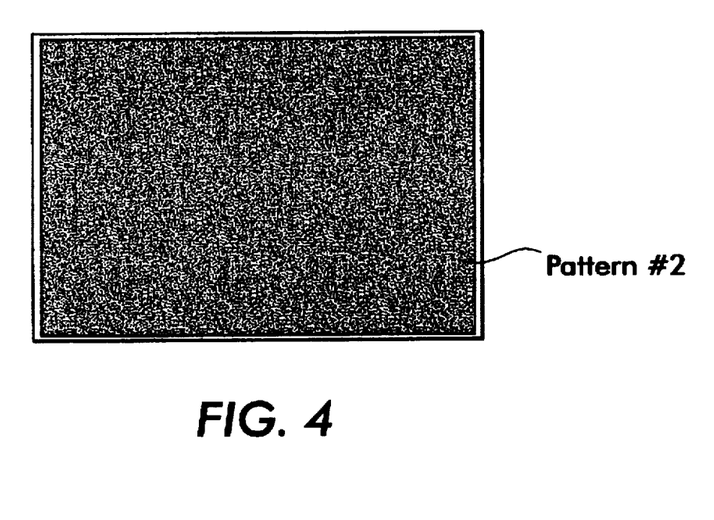
FIG. 4 is an illustration of a halftone image generated by a second stochastic screen.

To produce an invisible watermark in accordance with a preferred embodiment, a first stochastic halftone cell (stochastic screen) is produced to reproduce a gray image with acceptable image quality. A second stochastic halftone cell is produced that over a similar or corresponding portion of each of the two halftone cells the thresholds are either conjugate or identical, and therefore the patterns they produce are highly conjugately correlated or highly auto-correlated when applied to a constant gray scale input. The locations of the thresholds within the conjugate regions are optimized a second time to produce pleasing patterns as described, for example, by Wang in U.S. application patent Ser. No. 08/663,419, for a "STOCHASTIC HALFTONING SCREENING METHOD," filed Jun. 17, 1996 and assigned to a common assignee of the present invention, the teachings therein being hereby incorporated by reference. In this way, the second stochastic cell produces patterns of the same image quality as the first cell. When an image is halftoned using these two halftone cells and one copy of the image is superposed upon one another and shifted appropriately, the regions that are highly conjugately correlated, due to the conjugate screens therein, will appear dark, and the regions that are highly autocorrelated, due to the identical screens therein, will appear bright. By alternating the two halftone cells, and perhaps varying the characteristics of the similar portions of the halftone cells, information can be incorporated into the halftoned image. Turning now to FIGS. 3 and 4 and an implementation of the invention, there are shown two halftone patterns generated by a first and a second stochastic screen, respectively, produced by the stochastic screening process described. These patterns represent a single gray level and the screens are designed so that the patterns they generate are high frequency patterns that have very little power in low spatial frequencies. The design procedure takes into account wraparounds at the cell borders so that there are no edge effects when the patterns are replicated by subsequent halftone cells across the page, as it will be with the repeat of each cell.

A portion of the second stochastic screen for FIG. 4 is identical to the first screen for FIG. 3, while the other portion of the second screen is the conjugate of the first screen. If the threshold values of two screens are represented by $T_1(x, y)$ and $T_2(x, y)$, respectively, the identical and the conjugate relation between the two stochastic screens are described as:

$$T_2(x, y) = T_1(x, y), \text{ and} \quad (3)$$

$$T_2(x, y) = N - T_1(x, y), \quad (4)$$

where N is the number of total possible levels.

Figure 6:
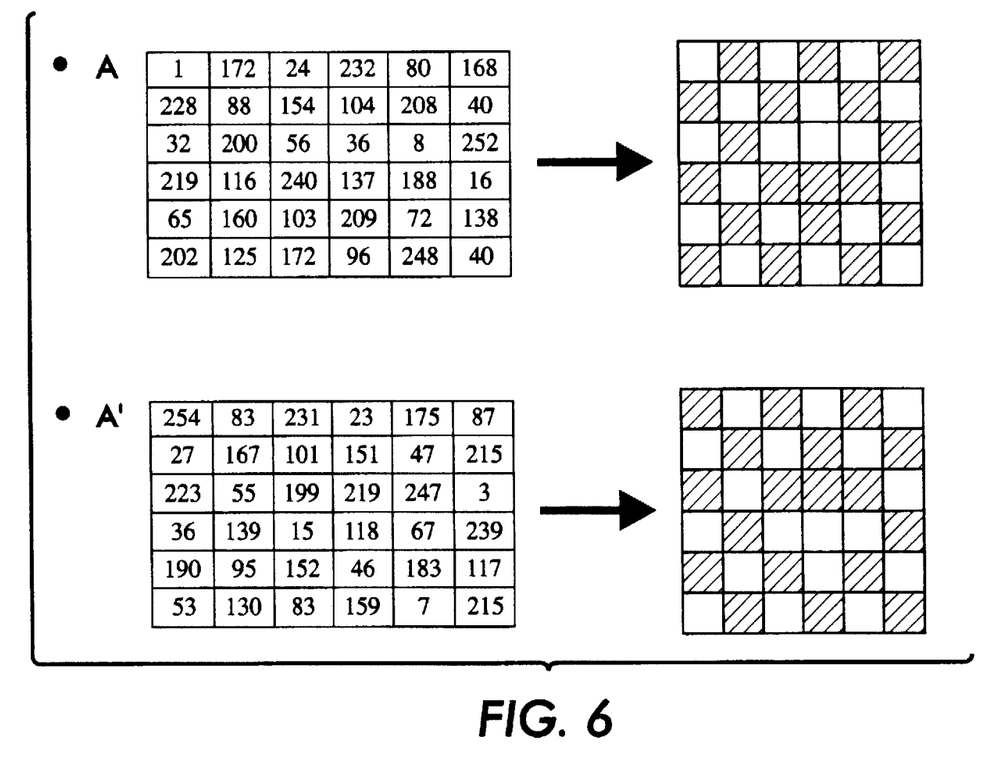
FIG. 6 is a composite image showing the conjugate correlation of areas where the second stochastic screen is conjugate of the first stochastic screen for producing the authentication images described for the present invention.

Examples of conjugate screens are found in FIG. 6. For example, screens A and A' are conjugates of one another and when a 50% gray scale value (e.g., 128, for N=255) is applied they would render the respective patterns indicated. If one were to superpose these patterns, it is apparent that there is a high conjugate correlation between the two and that the image resulting from an ORing operation would be completely black. If a gray scale value G greater than 128 were applied, the result of superposition of two respective halftone patterns generated by A and A' would not be a completely black, however, it would be the darkest among all possible combinations of the two halftone patterns both representing the gray scale value G. Obviously, it would be completely black for G less than 128.

Without close examination, the second halftone pattern will look very much like the first pattern. When the pattern of FIG. 3 is placed on top of FIG. 4 with careful alignment, the encoded information reveals itself on a macroscopic (e.g., halftone cell size) level. The information is encoded in the correlation relationship between the two patterns, macroscopically repeated and across broad areas, and not in the fine details or microscopic patterns.

Figure 5:
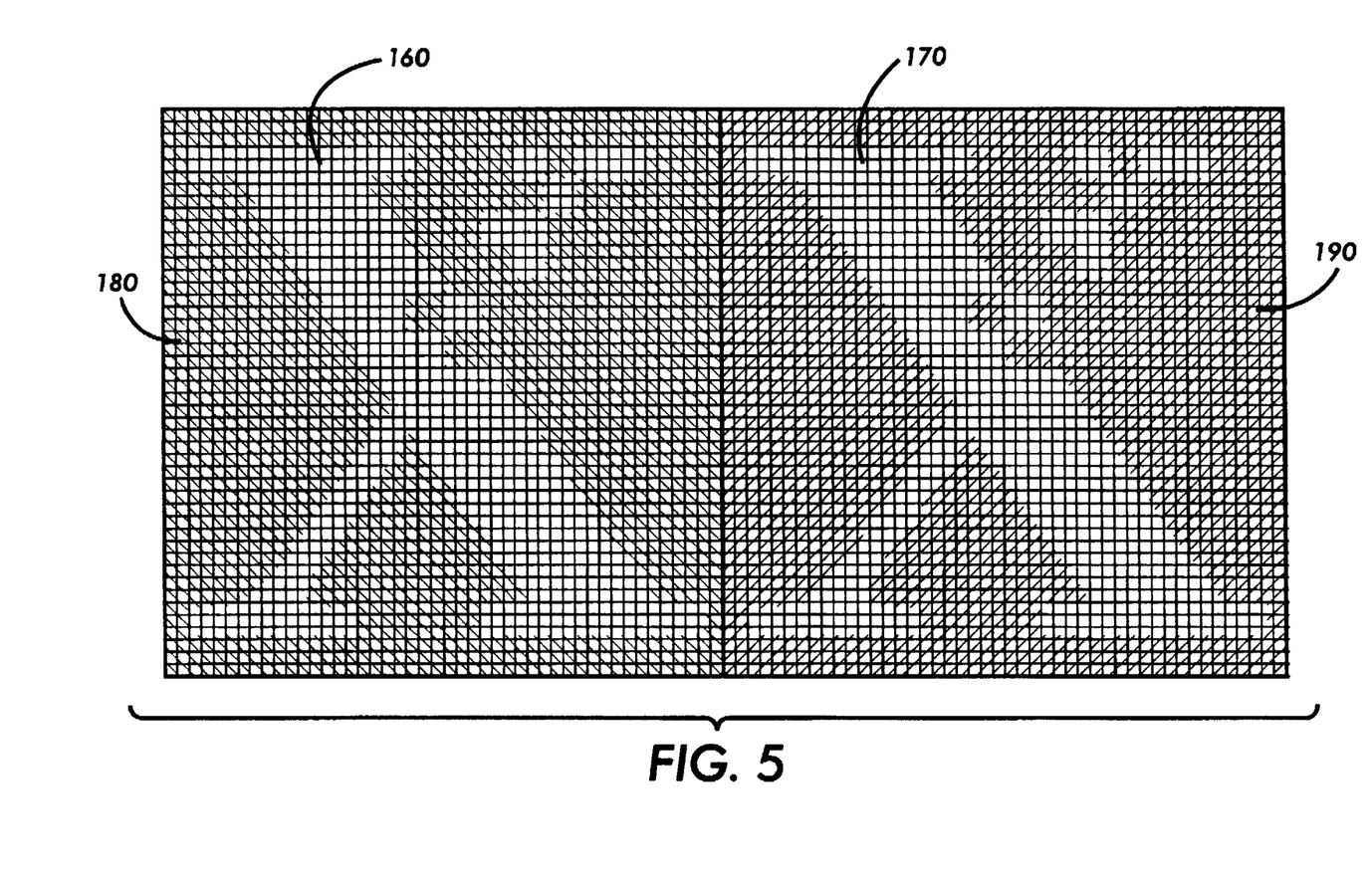
FIG. 5 is an illustration of the stochastic screen with the areas outlined in which the authentication image occurs.

In accordance with FIGS. 3 and 4, FIG. 5 illustrates the enlarged two stochastic screens side-by-side. The left half of FIG. 5 is the first stochastic screen and the right half is the second stochastic screen. In the area 160 corresponding to the figure of the digitized x that appears in FIG. 5, the first screen elements are identical to the elements in the area 170 of the second screen. In the area 180 of the first screen, screen elements are conjugates of corresponding elements in the area 190 of the second screen. Since the two screens are both based on the same stochastic screen optimization, the patterns generated by the two screens look approximately identical when viewed individually. However, when one pattern is superposed on the other pattern, as for example, by the mechanical action of printing the patterns of FIGS. 3 and 4 thereon on a transparency and carefully placing them in alignment, the auto-correlation and conjugate correlation between the images becomes apparent. More importantly, because the areas 180 and 190 contain conjugate elements, the correlation therebetween is significantly altered relative to the areas 160 and 170 of the halftone cells lying inside of the identical regions. Specifically, the areas of regions 160 and 170 will be strongly auto-correlated, while the conjugate regions 180 and 190 will be strongly conjugately correlated. It is the conjugately correlated relationship that gives rise to a stronger distinction between the two regions when the images are superposed.

It will be further appreciated that although described with respect to the mechanical comparison technique described above, the increased signal resulting from the difference between the correlated and conjugately correlated regions may be detected with image processing techniques. In particular, it may be possible to scan and digitize a digital-watermarked image and electronically superpose the conjugate image over the digitized image to detect the watermarked region thereon.

In an alternate method to generate an authenticable document, the information may also be incorporated by alternating between the two halftone cells while halftoning the original document. Therefore, the halftoned document is self-referencing and no special visualization "key" page is required for viewing the authentication image. Since portions generated by the two stochastic cells are side-by-side, self-referencing is immune from scaling and is robust to distortion introduced during printing and/or copying processes when the halftone document is generated or transferred. To achieve this alternate method, it is necessary to design the first and the second stochastic screens simultaneously. The combined stochastic screen, illustrated by FIG. 5, is composed of the left-half, as the first stochastic cell, and the right-half, as the second stochastic cell. During the design process, in addition of application of the optimization requirement for general stochastic screens (described by Wang in application Ser. No. 08/663,419) to the combined screen, constraints described by equations (3) and (4) have to be satisfied. As a matter of fact, both FIG. 3 and FIG. 4 are self-referencing documents with invisible watermarks besides the conjugate relation between the two figures described earlier. Each figure is generated by a combined stochastic screen with 128×64 elements, which are divided into the left-half and the right-half for the self-referencing function. In yet another embodiment, the techniques of the present invention may be applied to color images. It will be noted that the invention is not impacted by whether the document is a black and white document, or a color document made up of multiple color separations. In color documents, the authenticating screens may occur in any of the separations forming the final user images. It may be desirable, when attempting to detect the authentication image, to separate the image into separations, so that the other patterns used in the generation of color separations will not interfere with the detection of the authentication patterns The disclosed method may be readily implemented in software using object oriented software development environments that provide portable source code that can be used on a variety of computer or workstation hardware platforms. Alternatively, the disclosed image processing system may be implemented partially or fully in hardware using standard logic circuits or a VLSI design. Whether software or hardware is used to implement the system is dependent on the speed and efficiency requirements of the system, the particular function, and the particular software or hardware systems and microprocessor or microcomputer systems being utilized. The image processing system, however, can be readily developed by those skilled in the applicable arts without undue experimentation from the functional description provided herein together with a general knowledge of the computer arts.

In recapitulation, the present invention is a technique for generating watermarks in a digitally reproducible document that are substantially invisible when viewed. The technique includes: (1) producing a first screen pattern suitable for reproducing a gray image on a document; (2) deriving at least one conjugate screen description that is related to said first pattern; (3) producing a document image containing the first screen; (4) producing a second document image containing the first and the second screens in combination, whereby upon placing the first and second document images in a superposed relationship to allow viewing of both together, correlation between the first pattern on each document occurs everywhere within the documents where the first screen is used, and conjugate correlation occurs where the area where the first and second screens occur and the image placed therein using the conjugate screens becomes visible.

It is, therefore, apparent that there has been provided, in accordance with the present invention, a method and apparatus for providing digital watermarks. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

I claim:

1. A process for generating an authenticable document, wherein an authentication image inserted therein is not readily visually perceptible, including:

generating a first stochastic halftone screen;

generating a first user image using the first stochastic halftone screen;

generating a second stochastic halftone screen, related and distinct from the first stochastic halftone screen to form the authentication image therein, wherein a region of the second stochastic halftone screen is substantially a conjugate of a corresponding region of the first halftone screen and a remaining region of the second stochastic halftone screen is uncorrelated to a remaining region of the first halftone screen; and generating a second user image using the second stochastic halftone screen whereby upon placing the first and second user images in a superposed relationship to allow viewing of both user images together, a conjugate correlation occurs between the two stochastic halftone screens in the first and second user images everywhere within the region in which the second stochastic halftone screen is a conjugate of the corresponding region of the first stochastic halftone screen, and where visible noncorrelation occurs where the two stochastic screens are uncorrelated, so that the authentication image becomes visible in contrast between the conjugate correlation of the corresponding regions and the noncorrelation of the remaining regions enabling authentication of the authenticable document.

2. The process as described in claim 1, wherein the authenticable document is a color document comprising plural color separations, and the first stochastic pattern is used in one of the plural color separations in the first user image, and the first and second stochastic patterns are used together in one of the plurality of color separations in the second user image.

3. The process as described in claim 1, wherein the first and second images are digital images and wherein the step of placing the first and second images in a superposed relationship is accomplished by digital processing of the first and second images.

4. The process as described in claim 3, wherein the digital processing of the first and second images includes the step of logically combining at least the shifted portion of the images to detect the degree of correlation therein.

5. The process of claim 4, wherein the digital processing of the first and second images further includes shifting at least a portion of the first image relative to the second image.

6. The process as described in claim 1, wherein both the first and second images are rendered on substrates and at least one of the first and second images is rendered on a substantially transparent substrate and wherein the step of placing the first and second images in a superposed relationship is accomplished by placing the transparent substrate over the other substrate in an aligned relationship.

7. The process of claim 1, wherein the steps of generating a user image comprise:

applying a respective screen to an input image to produce a halftoned output image;

rendering the halftoned output image in a human viewable form; and scanning the rendered image to produce a respective user image as a digitized representation of the rendered image.

8. A process for generating an authenticable document, wherein an authentication image inserted therein is not readily visually perceptible, including the steps of:

generating a first halftone screen;

generating a first image using the first halftone screen;

generating a second halftone screen, related and distinct from the first halftone screen to form the authentication image wherein a region of the second halftone screen is substantially a conjugate of a corresponding region of the first halftone screen and the remaining region of the second halftone screen is identical to the remaining region of the first halftone screen;

generating a second user image using the second stochastic halftone screen;

superposing the first and second images to enable the detection of a conjugate correlation between the halftone screens in the first and second user images everywhere within the corresponding regions where the second halftone screen is a conjugate of the first halftone screen and auto-correlation between the halftone screens in the remaining regions where the second halftone screen is identical to the first halftone screen, the authentication image placed therein becoming detectable in contrast between the conjugate correlation and the auto-correlation to allow authentication of the authenticable document.

9. The process as described in claim 8, wherein the authenticable document is a color document comprising plural color separations, and the first stochastic pattern is used in one of the plural color separations in the first user image, and the first and second stochastic patterns are used together in one of the plurality of color separations in the second user image.

10. The process as described in claim 8, wherein the first and second images are digital images and wherein the step of placing the first and second images in a superposed relationship is accomplished by a logical combination of the first and second images.

11. A method of providing an authenticable document which is self-referencing, including the steps of:

generating a first stochastic screen;

generating a second stochastic screen, related and distinct from the first stochastic screen to form the authentication image therein, wherein a region of the second stochastic screen is substantially conjugate of a corresponding region of the first screen and a remaining region of the second stochastic screen is identical to a remaining region of the first halftone screen;

generating a user image by alternatively using the first stochastic halftone screen and the second stochastic halftone screen;

for a document to be authenticated and distributed, including the generated user image, selecting a first portion generated by the first stochastic screen from the user image and a second portion generated by the second stochastic halftone screen from the same user image and superposing the two portions, whereby the authentication image placed therein using the second stochastic halftone screen is detectable as a result of contrast between the conjugate correlation of the corresponding regions and the auto-correlation of the remaining regions to authenticate the authenticable document.

12. The method as described in claim 11, wherein each of the first and second stochastic screens are related as high spatial frequency patterns with relatively low power in any low spatial frequencies.

13. A method for authenticating a document including a digital watermark, including:

concurrently designing a first stochastic screen and a second stochastic screen simultaneously in accordance with an optimization metric, said designing step further including the constraint that a corresponding authentication region of both screens be comprised of values which are conjugates of one another;

rendering an image using the first stochastic screen and the second stochastic screen to produce a first image, wherein the image is rendered by alternating between the two stochastic screens so as to produce a self-referencing watermark;

reproducing at least a portion of the image to produce a second image; and detecting the authentication region by superposing a representation of the first image and a representation of the second image in an offset relationship so as to optimize the contrast of the authentication region resulting from the conjugate relationship between the first stochastic screen and the second stochastic screen.

14. The method of claim 13, wherein the step of detecting the authentication region further comprises scanning the rendered image to produce a digitized representation of the first image and storing the digitized representation of the first image; and where the step of reproducing at least a portion of the image to produce a second image comprises copying a portion of the stored digitized representation of the first image and storing the copied portion as the representation of the second image.

* * * * *